Patented July 31, 1934

1,968,784

UNITED STATES PATENT OFFICE 1,968,784

ARTIFICIAL STONE FLOOR AND METHOD OF MAKING IT

Edwin J. Milburn, Chicago, Ill., assignor to National Floor Company, Chicago, Ill., a co-partnership consisting of Arthur E. Burk, Edwin J. Milburn, and John A. Nolan No Drawing. Application October 31, 1931, Serial No. 572,445

7 Claims. (Cl. 94—19)

This invention relates in general to an artificial stone composition adapted to be cast and molded in blocks and other forms and more particularly described for use as flooring, and to the method of making a flooring or other articles of the material.

One of the principal objects of the invention is to produce a new and improved artificial stone particularly for flooring which is fireproof, waterproof, acid-proof and extremely hard when set so that it has a very durable wearing quality.

Another object of the invention is in the provision of an artificial stone material which is easily shaped and cut, as with an ordinary saw, and into which nails and other fastening devices may be driven or inserted, without cracking the material.

Another object of the invention is in the provision of an improved flooring material which may be cast in blocks and cut to shape for the purpose of forming designs in color, or to cast the material in a continuous slab, either form of which will harden quickly and smoothly and may be smoothed, sanded or polished, as desired.

In carrying out the invention some of the ingredients are thoroughly mixed together dry, and other ingredients are mixed to produce a wet mixture, and these two mixtures are then mixed together and applied to the surface to be covered.

To cover a surface of approximately fifty-five to sixty square feet with a layer one inch thick, the following ingredients are used; using the volume displaced by one hundred pounds of calcined magnesite as a measure, thoroughly mix together the following ingredients producing a dry mixture;

One part calcined magnesite,
Two parts of mill run maple sawdust,
One-half part of fine limestone screenings,
Three gallon measure of fine talc.

Mix together the following ingredients producing a wet mixture;

To one hundred pounds or one part of magnesium chloride, on a 60° Baumé hydrometer for heavy liquids; after the desired liquid is obtained, add one and one-half gallons of clear emulsified asphalt and mix the ingredients until they are thoroughly dissolved.

When the liquid mixture is added to the dry mixture the result and mix is thoroughly agitated and intermingled until it attains the consistency of mortar, and then one and one-half gallons of paraffin oil are added to the mixture and thoroughly intermingled and the entire mixture is applied to the floor or other surface to be covered immediately.

The hardness to which the material sets is governed by the strength of the chloride solution which is preferably 18 to 20° for use on a wood base and 20 to 22° if used on a concrete base.

The color of the sawdust affects the color of the composition, maple sawdust producing a composition of lighter appearance than oak sawdust.

In applying the material to a floor or other surface, all dirt, grease, and oil is removed until the surface is thoroughly clean and a bonding coat composed of the chloride solution and magnesite, mixed to produce a thin paste, is applied thereto. If the sub-surface is of stone or concrete, it is preferable to chip the floor at regular intervals and to apply the bonding coat for attaching the mixture to it.

In applying the mixture, it is smoothed in place like mortar and may be lightly tamped and leveled with a straight edge and after it has begun to set it is troweled to a desired finish and then allowed to harden or set. The setting time is usually from one to three hours, depending upon the temperature conditions.

In further finishing a floor or other surface of this material, it may be sanded, ground and polished to a very smooth finish and the surface may be waxed. To produce the best results the sanding or finishing should be done within two days of the original installation as the surface becomes very hard.

Batches of the material or portions thereof may be colored by adding coloring matter to the mixture and in producing designs in colors, the separate batches or portions of the colors should be hardened separately to produce a clear line of division between the colors.

While the above proportions of the ingredients are believed to produce the best results, some modification is possible to meet various conditions without departing from the spirit and scope of the invention.

I claim:

1. An artificial stone comprising the reaction products obtained by the intimate mixture of one hundred pounds of calcined magnesite, enough sawdust to displace twice the space taken by the magnesite, enough fine stone screenings to displace half of the place taken by the magnesite, one hundred pounds of magnesium chloride, one and one-half gallons of emulsified asphalt, and sufficient water to make a mixture of the consistency of soft mortar.

2. An artificial stone composition comprising the reaction products obtained by the intimate admixture of the following wet and dry mixtures;

the dry mixture comprising one hundred pounds of calcined magnesite, enough sawdust to displace twice the place taken by the magnesite, enough limestone screenings to displace half of the place taken by the magnesite, and three gallons of fine talc; and the wet mixture comprising one hundred pounds of magnesium chloride, enough water to make a mixture of a density of about 20° Baumé, and one and one-half gallons of emulsified asphalt; the parts being intimately mixed together and allowed to harden or set.

3. An artificial waterproof stone composition to produce approximately fifty-five to sixty square feet, one inch in thickness and comprising a mixture of one hundred pounds of calcined magnesite, enough sawdust to displace twice the space taken by the magnesite, enough fine limestone screenings to displace one-half the space taken by the magnesite and a three gallon measure of fine talc, one hundred pounds of magnesium chloride, one and one-half gallons of clear emulsified asphalt, one and one-half gallons of paraffin oil and enough water to make a mixture of the consistency of soft mortar.

4. The method of making a composition of matter which consists (1) in mixing magnesium chloride to a density of 18 to 22 degrees Baumé; (2) adding and mixing therein one and one-half gallons of clear emulsified asphalt until it is thoroughly dissolved; (3) adding slowly and mixing therein a previously mixed dry mixture comprising one hundred pounds of calcined magnesite; enough sawdust to displace twice the space taken by the magnesite; enough stone screenings to displace one-half of the space taken by the magnesite; and three gallons of fine talc; (4) in adding one and one-half gallons of paraffin oil to the mixture thus produced and mixing all the ingredients thoroughly together; and (5) in applying the mixture of the consistency of soft mortar to the floor or other surface to be covered and allowing the mixture to set.

5. The method of making an artificial stone composition which consists (1) in preparing a dry mixture consisting of one hundred pounds of calcined magnesite; enough sawdust to displace twice the space taken by the magnesite, enough fine stone screenings to displace one-half the space taken by the magnesite; and three gallons of fine talc; (2) in making a wet mixture consisting of one hundred pounds of magnesium chloride, enough water to produce a wet mixture of 18 to 22° Baumé, and in adding thereto one and one-half gallons of clear emulsified asphalt until it is dissolved; (3) in thoroughly mixing the wet and dry mixtures until they attain the consistency of soft mortar; (4) in then adding to the mixture one and one-half gallons of paraffin oil and thoroughly mixing it therein; and (5) in applying the mixture to the floor or other surface to be covered and allowing the mixture to set.

6. The method of making an artificial waterproof flooring, of a wet and dry mixture as set forth in claim 5, and in adding thereto an oil having a paraffin base; in applying the mixture to a surface to be covered; in leveling or smoothing the surface with a straight edge and trowel, in allowing the mixture to set; and in grinding and polishing the surface of the set mixture.

7. The method of applying an artificial stone coating to floor or other surface to be covered which consists in (1) chipping or scarifying the surface and (2) slushing it with a bonding solution made up by mixing together calcined magnesite, magnesium chloride and water until the mixture attains a pasty consistency; (3) in applying thereto a mixture of the consistency of soft mortar consisting of calcined magnesite, sawdust, stone screenings, talc, magnesium chloride, emulsified asphalt, paraffin oil and water in accordance with claim 5; (4) in smoothing off the mixture to the desired thickness and allowing it to set; and (5) in sanding, grinding, waxing and polishing the surface as desired.

EDWIN J. MILBURN.